United States Patent
Youbi-Idrissi et al.

(10) Patent No.: US 9,797,645 B2
(45) Date of Patent: Oct. 24, 2017

(54) METHOD FOR REGULATING THE TEMPERATURE OF THE STORAGE CHAMBER FOR PRODUCTS OF AN INDIRECT INJECTION VEHICLE TRANSPORTING HEAT-SENSITIVE PRODUCTS

(71) Applicant: L'Air Liquide, Societe Anonyme pour l'Etude et l'Exploitation des Procedes Georges Claude, Paris (FR)

(72) Inventors: Mohammed Youbi-Idrissi, Massy (FR); Cecile Clement, Saclay (FR); Antony Dallais, Janvry (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 321 days.

(21) Appl. No.: 14/395,213

(22) PCT Filed: Feb. 22, 2013

(86) PCT No.: PCT/FR2013/050366
§ 371 (c)(1),
(2) Date: Oct. 17, 2014

(87) PCT Pub. No.: WO2013/156696
PCT Pub. Date: Oct. 24, 2013

(65) Prior Publication Data
US 2015/0052912 A1     Feb. 26, 2015

(30) Foreign Application Priority Data
Apr. 18, 2012   (FR) ..................... 12 53546

(51) Int. Cl.
| | | |
|---|---|---|
| B60H 1/32 | (2006.01) |
| F25D 3/10 | (2006.01) |
| F25D 29/00 | (2006.01) |
| F25D 11/00 | (2006.01) |

(52) U.S. Cl.
CPC ........... *F25D 3/105* (2013.01); *B60H 1/3202* (2013.01); *F25D 11/003* (2013.01); *F25D 29/001* (2013.01)

(58) Field of Classification Search
CPC ...... F25D 3/105; F25D 11/003; F25D 29/001; B60H 1/3202
See application file for complete search history.

(56) References Cited

U.S. PATENT DOCUMENTS

2003/0019219 A1    1/2003   Viegas et al.

FOREIGN PATENT DOCUMENTS

| | | |
|---|---|---|
| EP | 0 599 625 | 6/1994 |
| WO | WO 2010 128 233 | 11/2010 |

OTHER PUBLICATIONS

International Search Report for PCT/FR2013/050366, mailed May 7, 2013.
Search Report for FR1253546, mailed Nov. 27, 2012.

*Primary Examiner* — Len Tran
*Assistant Examiner* — Ana Vazquez
(74) *Attorney, Agent, or Firm* — Christopher J. Cronin

(57) ABSTRACT

The invention relates to a method for transporting heat-sensitive products in a refrigerated lorry of the indirect injection type, wherein the temperature $T_{int}$ inside the storage chamber is regulated by varying the pinch of the exchanger (Pinch=$T_{int}$−TFluid outflow) according to the position of the internal temperature $T_{int}$ in relation to a temperature set value.

11 Claims, 3 Drawing Sheets

METHOD FOR REGULATING THE TEMPERATURE OF THE STORAGE CHAMBER FOR PRODUCTS OF AN INDIRECT INJECTION VEHICLE TRANSPORTING HEAT-SENSITIVE PRODUCTS

CROSS-REFERENCE TO RELATED APPLICATIONS

This application is a § 371 of International PCT Application PCT/FR2013/050366, filed Feb 22, 2013, which claims §119(a) foreign priority to French patent application 1253546, filed Apr. 18, 2012.

BACKGROUND

Field of the Invention

The present invention relates to the field of the transport and distribution of heat-sensitive products, such as pharmaceutical products and foodstuffs. In this field, the cold necessary for keeping the products at low temperature is provided mainly using two different technologies:

mechanical vapor-compression refrigeration units operating in a closed loop;

cryogenic units operating in open loop employing a direct or indirect injection of cryogenic fluids into the space containing the products.

The present invention relates more particularly to indirect-injection cryogenic solutions. In such solutions, the cryogenic fluid (those most often used are liquid nitrogen and liquid $CO_2$) is conveyed from a cryogenic reservoir carried onboard, usually underneath the refrigerated truck, to one or more heat exchangers situated inside the cold chamber or chambers of the truck, the exchangers being provided with means of circulating air. These exchangers allow the air internal to the chamber in which the products are stored, the air surrounding the exchangers, to be cooled to the desired temperature.

The heat extracted from the air first of all allows complete evaporation of the cryogenic fluid circulating through the exchanger, then allows the temperature thereof to be raised to a temperature close to that of the space. The cryogenic fluid leaving the exchanger is then discharged to the outside having given up the maximum amount of cooling energy.

Related Art

As those skilled in the art are well aware, there are nowadays solutions for controlling the temperature of the air internal to the body storing the transported products, chiefly according to algorithms that control the opening/closing of the valves that supply the exchangers with cryogen.

However, depending on the exchangers used, the exchanges of heat are not optimized, particularly during the transient phase when the chamber has not yet reached its reference temperature (as the temperature drops or increases): an insufficient surface area for exchange, a restricted flow rate of cryogen, poor distribution of the flow of cryogen to the various modules of the exchangers used, or even poor distribution on the air side may be the cause of such shortfalls in exchanger performance during this phase.

This may lead to the following observations:

the power obtained by the exchangers is sometimes not enough to reach negative temperatures;

the time taken to bring the temperature down is too long.

Let us recall that the method of control typically employed in trucks operating with indirect injection is as follows:

1—when the truck refrigeration system is started (for example when starting a round or after a prolonged stoppage of the refrigeration system for some reason or another) or even after a door has been opened, a mode in which the temperature is reduced rapidly (this industry refers to this as "pull down") is adopted.

2—Once the reference temperature has been reached in the product storage chamber, a control/regulation mode is adopted which allows the temperature of the product storage chamber to be held at the reference value ("hold").

Professionals in this field also speak of full-load operation (phase 1) or part-load operation (phase 2).

And precisely it may be believed that one of the reasons why heat exchanges are not optimized is connected with the control of the injection of the cryogen during the "pull down phase" during which the control algorithms currently used set a fixed temperature difference between the air of the space that is to be cooled and the temperature of the cryogen vapors leaving the exchanger. The value of this difference is determined in order to:

ensure that the system can operate in variable configurations: variable volume to be cooled and variable reference temperature, pull down phase, hold phase, etc.;

optimize the system while it is operating in steady state (during the hold phase).

As a consequence, by the fact that the regulation sets this difference in temperature between the air of the space that is to be cooled and the temperature of the cryogen leaving the exchanger (this difference is commonly referred to as the "pinch" of the exchanger) it is found that the power is limited during the critical pull down phase whereas it is during this phase that the system needs even more refrigerating power in order to accelerate the drop in temperature.

Let us look in greater detail at the types of regulation currently performed. At the start of the pull down phase, the temperature of the air in the space (the terms "body" or "chamber" are also used) to be cooled is very much higher than the reference temperature. By way of example of reference temperatures traditionally employed in this transport industry, mention may be made for example of a reference temperature of 0 to 4° C. for transporting fresh produce, whereas reference temperatures of −20° C. for transporting frozen products are encountered, it being possible for these two reference temperatures to be employed in two adjacent chambers of one and the same truck. The valves that regulate the injection of cryogen therefore open fully and remain open to allow an exchange of heat between the cold walls of the heat exchanger through which the cryogen circulates and the surrounding air, the temperature of which drops gradually until it is close to the reference temperature. At that moment, regulation of the valves begins to be applied in order to impose varying durations of closure so that the temperature of the air internal to the space can be "brought down" gently to around the reference temperature and held there for the remainder of the time.

However, as pointed out hereinabove, at the present time, this control is performed in such a way as to keep the "pinch" at a fixed value, preferably in a range from 5 to 20 K, regardless of the phase of operation of the system (pull down or hold).

Now, in the pull down phase, the power required is, as has already been pointed out hereinabove, greater and needs the temperature of the fluid to be as low as possible so that more power can be delivered to the air inside the chamber.

Summary Of The Invention

Therefore it is a notable objective of the present invention to propose a new method control governing the operation of such indirect-injection transports so as to allow the system to operate optimally during all phases of operation.

As will be seen in greater detail in what follows, the present invention notably proposes a solution for regulating the temperature of the cold chamber by optimizing exchanges of heat and improving the performance of the exchangers, notably by increasing the refrigeration power supplied during the pull down phase.

To do that, the present invention proposes to take into consideration a parameter that regulates the pinch of the exchanger, which parameter can vary according to the temperature reached by the air in the space that is to be cooled. The objective is therefore to have a large difference between the outlet temperature of the cryogen and the temperature of the air internal to the chamber as long as the latter temperature is not close to its reference temperature. This then encourages the supply of more cryogenic fluid to the exchanger and therefore a much higher delivered power.

As the air temperature approaches the reference temperature, the demand for energy is not as great because the volume of air and the walls of the truck have been cooled and their thermal inertia has, to a large extent, been overcome at this phase in the operation and it therefore becomes permissible to keep a higher cryogen outlet temperature and therefore a lower difference (pinch) between the temperatures of the air inside the chamber and at the cryogen outlet.

The present invention therefore relates to a method for transporting heat-sensitive products in a refrigerated truck, of the type in which the truck is provided:

with at least one product storage chamber,
with a reservoir of a cryogenic fluid such as liquid nitrogen (or any other liquefied cryogenic fluid),
with a heat exchanger system internal to said at least one chamber, through which system the cryogenic fluid circulates,
with an air circulation system, for example of the blower type, able to bring the air internal to the chamber into contact with the cold walls of the heat exchanger system,
with temperature sensors able to determine the temperature of the atmosphere internal to said at least one chamber ($T_{int}$) on the one hand and that of the cold vapors leaving all or some of the exchangers of the system ($T_{fluid\ outlet}$) on the other hand,
and with a control and management unit able to regulate the internal temperature $T_{int}$ to a reference value $T_{ref}$ by ordering a closing or opening, or the degree of such opening/closing, of one or more valves supplying the exchanger system with cryogenic fluid;

characterized in that the temperature $T_{int}$ is regulated by implementing the following measures:

the following parameters are determined in real time:
  i) $\Delta T = T_{int} - T_{ref}$; and
  j) the value of the Pinch = $T_{int} - T_{fluid\ outlet}$;
a parameter P, which is a function of $\Delta T$, is taken into consideration and the control and management unit, as long as the Pinch is below or equal to the parameter P, commands the holding open or increased opening of the valve or valves used to supply the exchanger system with cryogenic fluid.

According to one preferred embodiment of the invention, the or each of the valves supplying the exchanger system with cryogen are of the "all-or-nothing" type, and the regulation according to the invention then commands the full opening of this or these valves as long as the Pinch is below or equal to the parameter P.

However, it is also possible, without at any time departing from the scope of the present invention, to use other types of valves and notably proportional valves which of course offer a greater range of activation options, in which case the regulation according to the invention then commands, according to the algorithm used, as long as the Pinch is below or equal to the parameter P, the wide or full opening of this or these valves or the increased opening thereof depending on the moment considered within this phase.

According to the invention, when the Pinch is higher than the parameter P, the control and management unit commands the closing of the valve or valves supplying the exchanger system or commands a reduction in their opening, according to the moment considered within this phase and once again according to the algorithm chosen for governing the operation of the regulation:

according to a preferred implementation of the invention, the or each of the valves supplying the heat exchanger system with cryogen are of the "all-or-nothing" type and the regulation according to the invention therefore commands the full closing of this or these valves when the Pinch rises above the parameter P.

according to another implementation of the invention, however, the or each of the valves supplying the exchanger system are proportional valves and the regulation according to the invention therefore commands, according to the algorithm used, when the Pinch rises above the parameter P, the partial or full closure or a reduction in the opening of this or these valves according to the moment considered within this phase.

From reading the foregoing it will therefore have been understood that the approach to regulation according to the present invention is not to fix the Pinch = $T_{int} - T_{fluid\ outlet}$, but rather to make it vary according to the value of $\Delta T$, i.e according to where the temperature within the chamber lies in relation to reference value, and therefore according to the frigories needed at the phase of the transport considered (pull down phase, hold phase).

This approach has led the applicant company to propose and test various equations for taking $\Delta T$ into consideration, through various expressions of a parameter P expressed as a function of $\Delta T$.

Three different parameters P, i.e. three different functions of $\Delta T$ are illustrated hereinbelow:

$$P = a\ln(1 + \text{abs}(\Delta T)) + b \qquad \text{(Equation 1)}$$

$$P = a\ln(1 + \text{abs}(\Delta T)) + (b \times T_{ref} + c) \times \text{abs}(\Delta T) + d \qquad \text{(Equation 2)}$$

$$P = (a \times \text{abs}(\Delta T) + b) \times e^{\frac{-1}{1+\text{abs}(\Delta T)^2}} + (c \times \text{abs}(\Delta T) + d) \times e^{-\text{abs}(\Delta T)} \qquad \text{(Equation 3)}$$

Where "ln" is the naperian logarithm function, "abs" is the absolute value function, and "e" is the exponential function.

As will be clearly apparent to a person skilled in the art, other functions could be proposed but the applicant company wishes here to illustrate the approach by the invention and how it can be implemented to good effect through examples, the benefit of the present invention and the added-value thereof being that of having proposed regulation as a function of a parameter P expressed as a function of $\Delta T$.

As will be illustrated hereinbelow, experiments conducted have shown that regulation according to equation 3 is the regulation that offers the optimum exchanger performance.

Further, it will be noted that this equation 3 has been tested with factors a, b, c, and d that have values in the following ranges:
--> a=−0.5 to −0.005
--> b=0 to 100
--> c=0 to 20
--> d=0 to 20

According to one of the preferred implementations of invention, preference is given to:
- a large pinch (several tens of degrees of difference), for example of 50 K under conditions for frozen and 30 K under conditions for fresh, for most of the "pull down" phase;
- a pinch which reduces abruptly when the internal temperature is a few degrees away from the reference, preferably of less than 2 K;
- a pinch that is kept constant when the internal temperature reaches the reference temperature.

BRIEF DESCRIPTION OF THE FIGURES

Further, the attached FIGS. 1, 2 and 3 will provide a clear understanding of the benefit reaped by such regulation according to equation 3.

DETAILED DESCRIPTION OF THE INVENTION

Figure 1:
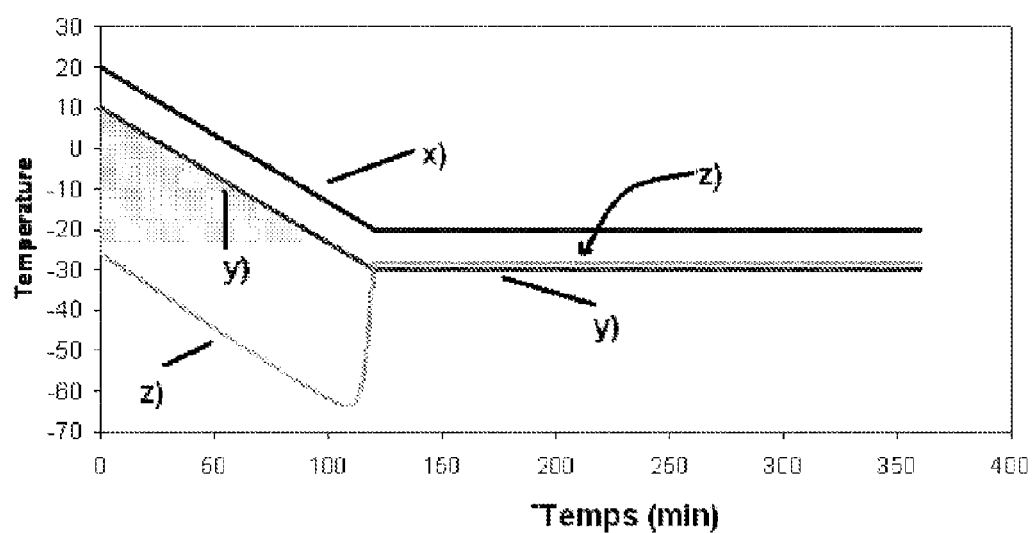
FIG. 1 represents the change in temperature internal to the chamber $T_{int}$ (curve x)) and of the exchanger outlet temperature $T_{outlet}$ according to the prior art (regulations currently performed: fixed pinch=curve y)) and according to the invention (variable pinch, curve z)).
Figure 2:
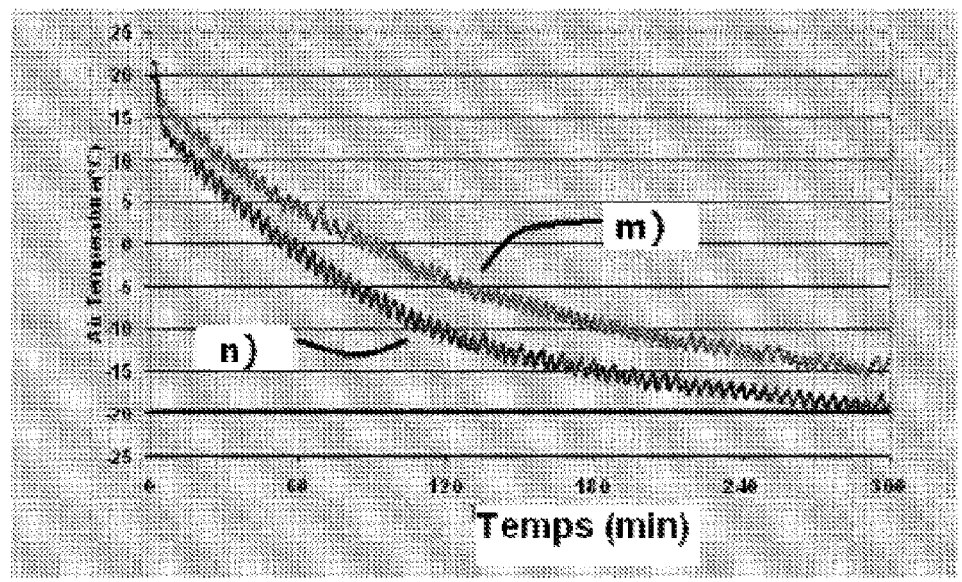
FIG. 2 depicts the two temperature-drop curves obtained in the chamber, using the regulations currently employed (curve m)) and according to the invention (curve n)).
Figure 3:
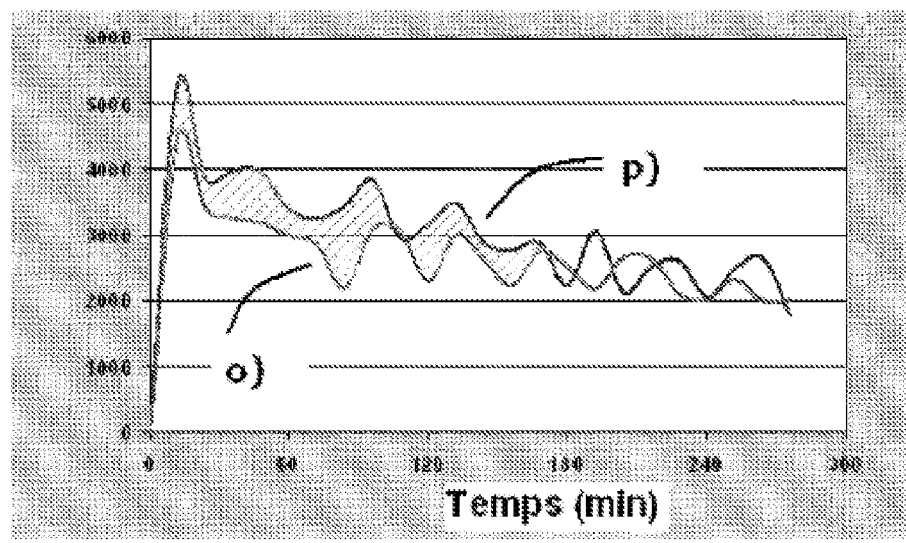
FIG. 3 depicts the two curves of power supplied (in W) as a function of time, using the regulations currently employed (curve o)) and according to the invention (curve p)), the hatched area highlighting the difference in power supplied according to the invention, especially during the first moments of pull down.

The approach of the invention of employing a far greater pinch during pull down (FIG. 1) and the very positive outcome of such an approach can therefore be clearly seen:
- with a pull down time which is faster by virtue of the invention (FIG. 2): an approximately 30% reduction in the pull down time can be seen (whether for temperatures close to 4° C. for fresh produce or negative temperatures for frozen products);
- which can be explained unambiguously by the difference in power transferred to the system by virtue of the invention (the hatched part in FIG. 3); at least 25% additional power is transferred during the pull down phase.
- this regulation also enables savings in cryogen to be realized, notably during the pull down phase, given that this phase does not last as long by virtue of the present invention. Experiments conducted by the applicant company have also demonstrated that by virtue of the present regulation, a drop in consumption is recorded for refrigerated transport scenarios for which the total duration of the round (pull down and hold) does not exceed 6 to 8 hours.

Figure 4:
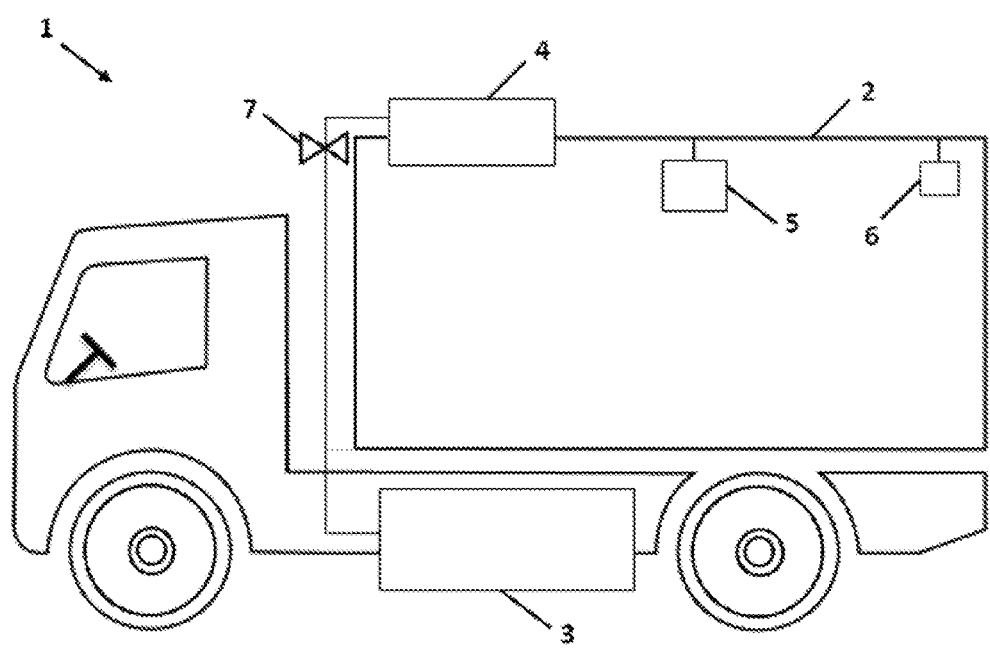

FIG. 4 depicts an exemplary refrigeration truck for transporting heat-sensitive products according to the present invention. As shown, refrigeration truck 1 provides product storage chamber 2, reservoir of a cryogenic fluid 3, heat exchanger system 4, air circulation system 5, temperature sensors 6, and valves 7.

As will also be clearly apparent to those skilled in the art, the invention as has just been described applies to the case of a single chamber within a truck but also to the case of several product storage chambers within a truck, and the invention therefore allows the temperature within each of these chambers to be regulated, each of the chambers being equipped with an exchanger system, each of the chambers having to comply with its own internal reference $T_{ref}$ according to the products it is to store, the control system measuring in real time the temperature internal to each chamber $T_{int}$, that of the cold vapors leaving all or some of the exchangers of the exchanger system of each chamber ($T_{fluidoutlet}$), the pinch associated with each chamber, etc.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of"or "consisting of" and remain within the expressly defined scope of "comprising".

"Providing" in a claim is defined to mean furnishing, supplying, making available, or preparing something, The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for transporting heat-sensitive products in a refrigerated truck, of a type in which the truck is provided:

with at least one product storage chamber,
with a reservoir of a cryogenic fluid,
with a heat exchanger system internal to said at least one chamber, through which system the cryogenic fluid circulates,
with an air circulation system, able to bring an air internal to the chamber into contact with cold walls of the heat exchanger system,
with temperature sensors able to determine the temperature of an atmosphere internal to said at least one chamber ($T_{int}$) and that of cold vapors leaving the heat exchangers system ($T_{fluid\ outlet}$)
and with a control and management unit able to regulate the internal temperature $T_{int}$ to a reference value $T_{ref}$ by ordering a closing or opening, or a degree of such opening/closing, of one or more valves supplying the heat exchanger system with cryogenic fluid;
characterized in that the temperature $T_{int}$ is regulated by implementing the following measures:
the following parameters are determined in real time:
a) $\Delta T = T_{int} - T_{ref}$; and
b) a value of a Pinch of the heat exchanger system, where:
Pinch $= T_{int} - T_{fluid\ outlet}$; and
a parameter P, which is a function of $\Delta T$, is taken into consideration and the control and management unit, as long as the Pinch is below or equal to the parameter P, commands the holding open or increased opening of the valve or valves used to supply the heat exchanger system with cryogenic fluid.

2. The method for transporting heat-sensitive products in a refrigerated truck of claim 1, wherein when the Pinch rises above the parameter P, the control and management unit orders the partial or full closure or a reduction in the opening of the valves depending on where the temperature within the chamber lies in relation to a reference, and within a pull down phase or a hold phase.

3. The method for transporting heat-sensitive products in a refrigerated truck of claim 2, wherein the or each of the valves supplying the heat exchanger system with cryogen are of an "all-or-nothing" type and the control and management unit therefore commands the full closing of this or these valves when the Pinch rises above the parameter P.

4. The method for transporting heat-sensitive products in a refrigerated truck of claim 2, wherein the or each of the valves supplying the heat exchanger system with cryogen are of a proportional valve type and the control and management unit therefore commands, when the Pinch rises above the parameter P, the partial or full closure or a reduction in the opening of this or these valves according to where the temperature within the chamber lies in relation to a reference, and within a pull down phase or a hold phase.

5. The method for transporting heat-sensitive products in a refrigerated truck of claim 1, wherein the or each of the valves supplying the heat exchanger system with cryogen are of, an "all-or-nothing" type, and the control and management unit then commands the full opening of this or these valves as long as the Pinch is below or equal to the parameter P.

6. The method for transporting heat-sensitive products in a refrigerated truck of claim 1, wherein the or each of the valves supplying the heat exchanger system with cryogen are of a proportional valve type and the control and management unit then commands, according to where the temperature within the chamber lies in relation to a reference, and within a pull down phase or a hold phase.

7. The method for transporting heat-sensitive products in a refrigerated truck of claim 1, wherein the parameter P is expressed as a function of $\Delta T$ using a formula in the form:

$$P = a \ln(1 + \text{abs}(\Delta T)) + b \quad \text{(Equation 1)}$$

where "ln" is a naperian logarithm function, and "abs" is an absolute value function.

8. The method for transporting heat-sensitive products in a refrigerated truck of claim 1, wherein the parameter P is expressed as a function of $\Delta T$ in a formula of the form:

$$P = a \ln(1 + \text{abs}(\Delta T)) + (b \times T_{ref} + c) \times \text{abs}(\Delta T) + d \quad \text{(Equation 2)}$$

where "ln" is a naperian logarithm function, and "abs" is an absolute value function.

9. The method for transporting heat-sensitive products in a refrigerated truck of claim 1, wherein the parameter P is expressed as a function of $\Delta T$ in a formulation of the form:

$$P = (a \times \text{abs}(\Delta T) + b) \times e^{\frac{-1}{1+\text{abs}(\Delta T)^2}} + (c \times \text{abs}(\Delta T) + d) \times e^{-\text{abs}(\Delta T)} \quad \text{(Equation 3)}$$

where "abs" is an absolute value function and "e" is an exponential function.

10. A method for transporting heat-sensitive products in a refrigerated truck of claim 1, wherein the cryogenic fluid is liquid nitrogen.

11. A method for transporting heat-sensitive products in a refrigerated truck of claim 1, wherein the air circulation system is a blower type.

* * * * *